(12) United States Patent
Yeom

(10) Patent No.: US 8,488,625 B2
(45) Date of Patent: Jul. 16, 2013

(54) QOS CONTROL SYSTEM AND METHOD OF VOIP MEDIA PACKET RECEIVED FROM BROADBAND PORT IN ROUTER/GATEWAY-INTEGRATED VOIP SYSTEM

(75) Inventor: Eung-Moon Yeom, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 618 days.

(21) Appl. No.: 12/496,818

(22) Filed: Jul. 2, 2009

(65) Prior Publication Data

US 2010/0002688 A1    Jan. 7, 2010

(30) Foreign Application Priority Data

Jul. 2, 2008  (KR) .................. 10-2008-0063992

(51) Int. Cl.
*H04J 3/16* (2006.01)
(52) U.S. Cl.
USPC .......................................... 370/468

(58) Field of Classification Search
None
See application file for complete search history.

(56) References Cited

U.S. PATENT DOCUMENTS

| 2004/0179515 | A1* | 9/2004 | Kamani et al. | 370/352 |
| 2004/0242235 | A1* | 12/2004 | Witana | 455/452.2 |
| 2006/0280162 | A1* | 12/2006 | Zhao et al. | 370/352 |
| 2007/0140113 | A1* | 6/2007 | Gemelos | 370/229 |

* cited by examiner

*Primary Examiner* — Chirag Shah
*Assistant Examiner* — Amar Persaud
(74) *Attorney, Agent, or Firm* — The Farrell Law Firm, P.C.

(57) ABSTRACT

A Quality-of-Service (QoS) control system and method of a Voice over Internet Protocol (VoIP) packet received from a broadband port in a router/gateway integrated VoIP system, which can process an incoming VoIP call by detecting in real-time an available bandwidth of the VoIP packet through interaction with a QoS module, determining whether to allow the VoIP call based on the result of the detection, and responding to the VoIP call based on the result of the determination. The QoS can be ensured according to the size of a VoIP media packet received through a broadband port.

10 Claims, 5 Drawing Sheets

QOS CONTROL SYSTEM AND METHOD OF VOIP MEDIA PACKET RECEIVED FROM BROADBAND PORT IN ROUTER/GATEWAY-INTEGRATED VOIP SYSTEM

PRIORITY

This application claims priority under 35 U.S.C. §119(a) to a Korean patent application filed in the Korean Intellectual Property Office on Jul. 2, 2008, and there duly assigned Serial No. 2008-0063992, the entire disclosure of which is hereby incorporated by reference.

BACKGROUND OF THE INVENTION

1. Field of the Invention

The present invention relates to technology that determines whether to process a Voice over Internet Protocol (VoIP) call based on the presence of an available bandwidth through interactivity of a data packet with a Quality-of-Service (QoS) module in the case of responding to the VoIP call input from an all-in-one VoIP system in which a switch/router supporting traffic management and an Internet Protocol-Private Branch exchange (IP-PBX) supporting a VoIP call service are integrated together.

2. Description of the Related Art

As is well known in the art, an all-in-one system in which a switch/router supporting traffic management and an Internet Protocol-Private Branch eXchange (IP-PBX) supporting a VoIP call service are integrated together determines a method of a Session Initiation Protocol (SIP) response based on bandwidth measured by a regulator.

In the case where an available bandwidth is present, the all-in-one system responds by selectively using a type of media codec, a multi-frame count, and silence suppression corresponding to a media traffic bandwidth corresponding to the available bandwidth.

The all-in-one system also ensures QoS by determining whether to accept an incoming VoIP call based on the state of processing internal data packets when handling the call.

In addition, a QoS process is not generally performed on an ingress packet from a Wideband Area Network (WAN) or a broadband area network. In particular, there is no function for responding to the VoIP call according to an available bandwidth for processing the VoIP packet.

A common data packet rather than a VoIP packet has a packet size on the order of 3 Kbytes (e.g., http: 3 Kbytes, e-mail: 2 Kbytes, FTP: 2 Kbytes, telnet: 1 Kbyte, others: 3 Kbytes). A packet of this size can be introduced from the WAN side and be entirely processed (with 100% forwarding performance) without packet drops by a router.

Like an OfficeServ Integrated Access Device (IAD), an Internet Protocol (IP) converged system does not perform an additional IP QoS process because all IP packets on the WAN side can be processed since a switch is connected to a lower point.

For example, in a WAN with one 1 gigabyte port and twenty four 100 megabyte switch ports, even if 1 gigabyte packet has egressed from the WAN, the packet is forwarded to switch points (i.e., 24 ports corresponding to 2.4 G) and thus it is determined that there are no bottle neck. In addition, the switches can forward the packet 100 percent through hardware-based routing.

In the case of a VoIP media packet, however, the packet size is different according to the type of media codec, the multi-frame count, and the silence suppression. The IP QoS function is not applied when a VoIP packet of 128 bytes or less is introduced on the WAN side. In this case, all packets are not forwarded, and some packets may be dropped according to the performance of the router.

The conventional all-in-one system including the switch/router and the VoIP gateway cannot respond based on the presence of an available bandwidth in a VoIP incoming call in order to ensure the QoS of an ingress VoIP packet on the WAN side. Accordingly, the VoIP QoS cannot be ensured.

In addition, in the case of processing a small IP packet of 128 bytes or less, it is impossible to determine a process based on a bandwidth according to IP packet-forwarding performance or a resultant selection of a suitable codec. Furthermore, there are no response functions for multi-frame and silence suppression.

SUMMARY OF THE INVENTION

The present invention has been made to solve at least the foregoing problems of the prior art. An aspect of the present invention provides a Quality-of-Service (QoS) control system and method of a Voice over Internet Protocol (VoIP) packet received from a broadband port in a router/gateway integrated VoIP system, which can process an incoming VoIP call by detecting in real-time an available bandwidth of the VoIP packet through interactivity with a QoS module, determining whether to allow the VoIP call based on the result of the detection, and responding to the VoIP call based on the result of the determination.

Another aspect of the present invention provides a QoS control system and method of a VoIP packet received from a broadband port in a router/gateway integrated VoIP system, which can ensure the QoS of the VoIP media by responding to a call according to a response method in which a codec type, multi-frame count and silence suppression are set.

A further aspect of the present invention provides a QoS control system and method of a VoIP packet received from a broadband port in a router/gateway integrated VoIP system, which can utilize a function of notifying that an incoming VoIP call is rejected due to business or an increasing amount of traffic by notifying the status of a local IP processing unit to a VoIP caller based on an automatic response function when having to reject the incoming VoIP call due to insufficient bandwidth.

According to an aspect of the invention, there is provided a QoS control system of a VoIP media packet received from a broadband port in a router/gateway integrated VoIP system. The QoS control system may include a switch/router storing a size of a VoIP media packet and bandwidth information according to the size of a VoIP media packet, detecting the size of a VoIP media packet from a VoIP media bandwidth information request message when the VoIP media bandwidth information request message is received from a VoIP gateway connected over a broadband local network, and transmitting a response message, including available bandwidth information of a queue according to the size of a VoIP media packet, to the VoIP gateway; and the VoIP gateway transmitting the VoIP media bandwidth information request message to the switch/router when an invite message is received from an Internet Protocol (IP) terminal, receiving the response message, including available bandwidth information of a queue according to the size of a VoIP media packet, from the switch/router, and if an available bandwidth of the queue is present, processing a call of the VoIP media packet by transmitting a response message to the IP terminal.

According to another aspect of the invention, there is provided a QoS control method of a VoIP media packet received from a broadband port in a router/gateway integrated VoIP system. The QoS control method may include storing, at a switch/router, a size of a VoIP media packet and bandwidth information according to the size of a VoIP media packet; transmitting, at a VoIP gateway, a VoIP media bandwidth information request message to the switch/router connected over a broadband local network when an invite message is received from an Internet Protocol (IP) terminal; detecting, at the switch/router, the size of a VoIP media packet from the VoIP media bandwidth information request message when the VoIP media bandwidth information request message is received from the VoIP gateway and transmitting a response message, including available bandwidth information of a queue according to the size of a VoIP media packet, to the VoIP gateway; and receiving, at the VoIP gateway, the response message, including available bandwidth information of a queue according to the size of a VoIP media packet, from the switch/router, and if an available bandwidth of the queue is present, processing a call of the VoIP media packet by transmitting a response message to the IP terminal.

As described above, the QoS control system and method of a VoIP packet received from a broadband port in a router/gateway integrated VoIP system of the invention, can provide QoS according to the size of a VoIP media packet received through a broadband port.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EXEMPLARY EMBODIMENTS

The present invention will now be described more fully hereinafter with reference to the accompanying drawings, in which embodiments of a QoS control system and method of a VoIP media packet are received from a broadband port in a router/gateway-integrated VoIP system in accordance with the invention. It will be understood by those skilled in the art that a system described below is merely exemplified for describing the invention with no limit to the scope of the present invention.

Figure 1:
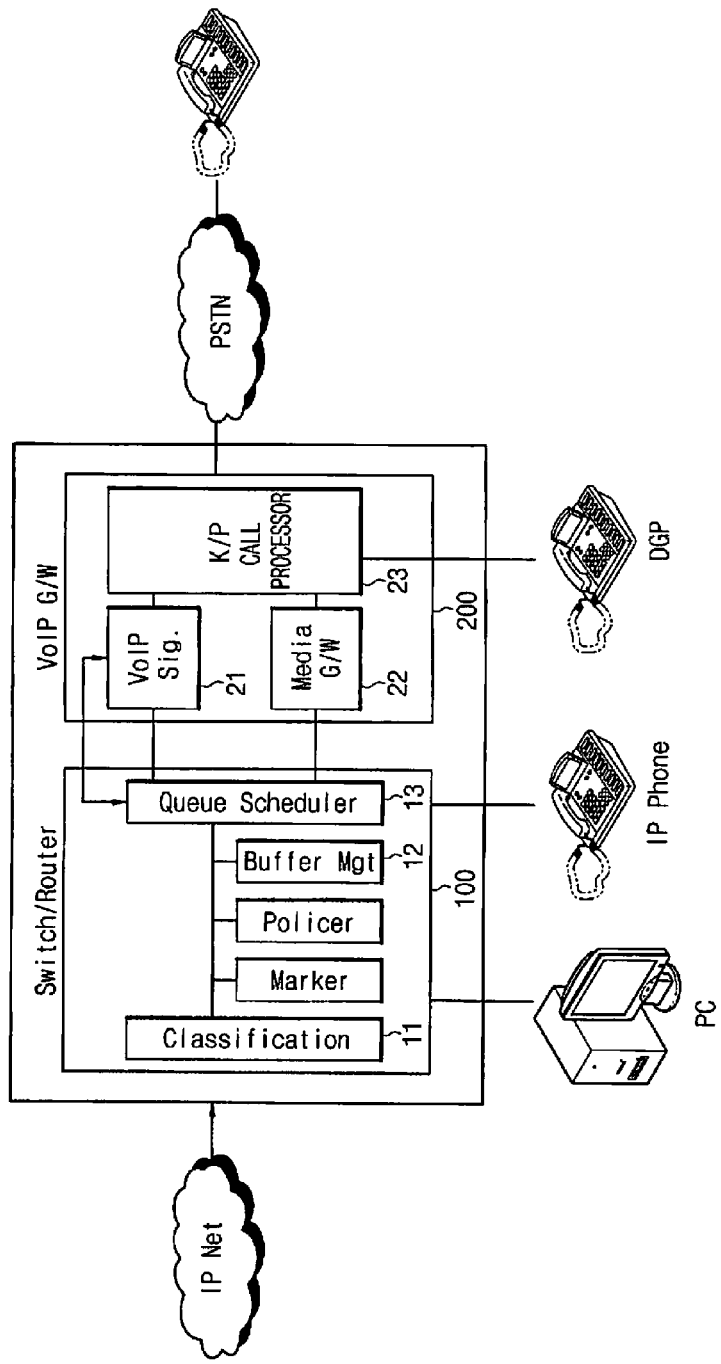
FIG. 1 is a block diagram illustrating the construction of a QoS control system of a VoIP media packet received from a broadband port in a typical router/gateway-integrated VoIP system.
Figure 2:
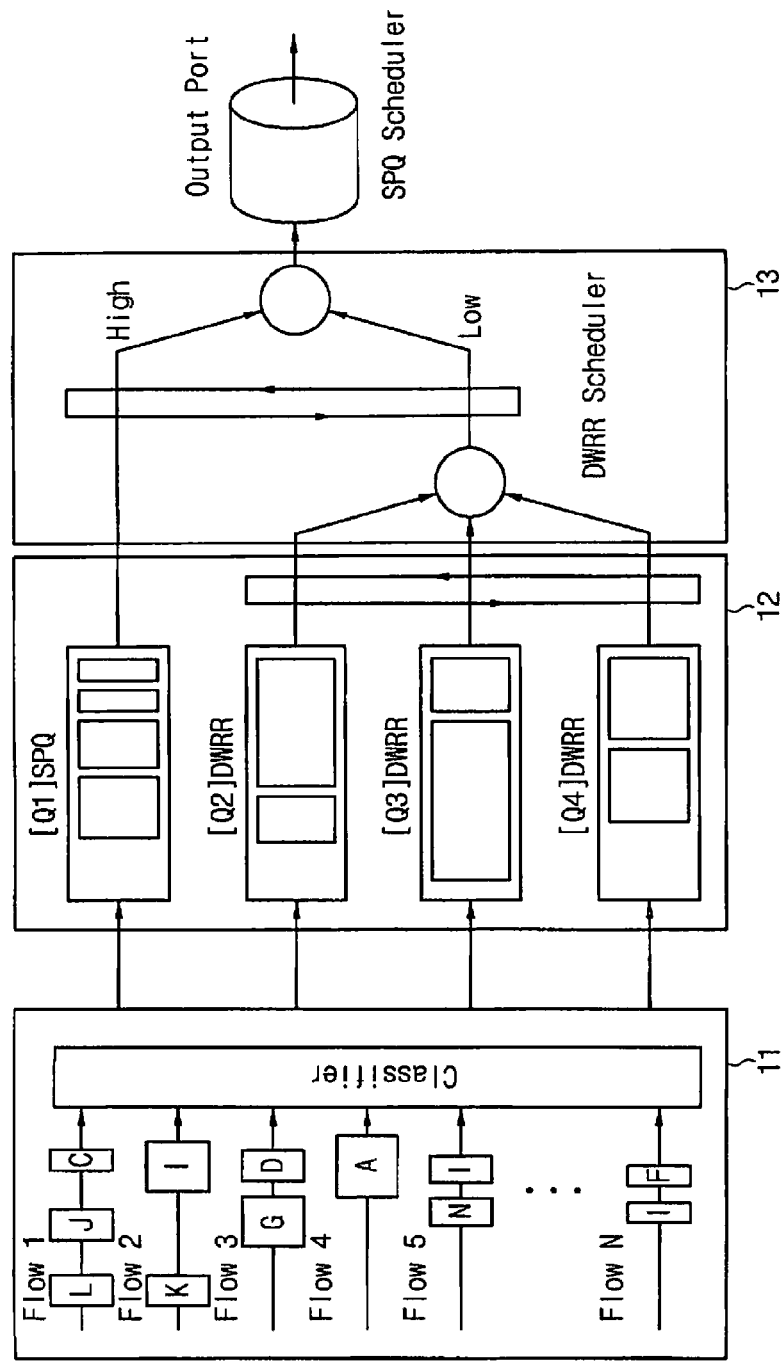
FIG. 2 is a block diagram illustrating the construction of a switch/router in the router/gateway-integrated VoIP system shown in FIG. 1.

FIG. 1 is a block diagram illustrating a router/gateway-integrated VoIP system or all-in-one VoIP system in accordance with an embodiment of the invention in which a switch/router 100 capable of supporting QoS by managing traffic according to data traffic characteristics and a VoIP gateway 200 supporting a VoIP call service are integrated. FIG. 2 is a block diagram illustrating a switch/router of FIG. 1.

As shown in FIGS. 1 and 2, the switch/router 100 includes a classifier 11, a buffer manager 12, and a traffic queue scheduling processor 13. The classifier 11 classifies packets according to data traffic characteristics such as an IP, a port and a protocol. The buffer manager 12 includes at least one queue having priority, and temporarily stores the packets according to the data traffic characteristics classified by the classifier 11 so that the packets stand by. The traffic queue scheduling processor 13 includes a first scheduler performing scheduling of queues of real time and non-real time packets and a second scheduler performing scheduling between the queues of the non-real time packets. The VoIP gateway 200 includes a VoIP signal processor 21, a media gateway 22, and a key phone call processor 23. The traffic scheduling processor 13 classifies VoIP media packets based on IP and/or a port number of an origination and/or a destination when the IP and/or port number are designated. The traffic scheduling processor 13 detects VoIP media IP/port through interaction with a VoIP signaling module.

When IP media packets are received over an IP network, the all-in-one VoIP system in which the switch/router 100 capable of supporting QoS by managing traffics according to data traffic characteristics and a VoIP gateway 200 supporting a VoIP call service are integrated as described above performs QoS with only non-real time packets.

Figure 3:
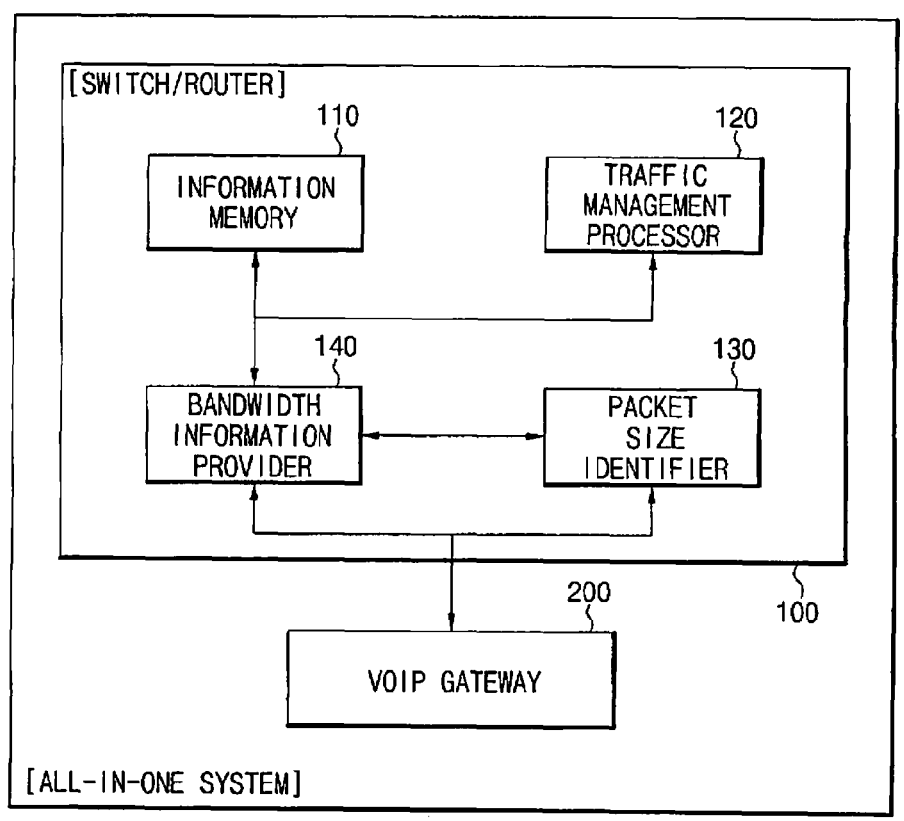
FIG. 3 is a block diagram illustrating the construction of a QoS control system of a VoIP media packet received from a broadband port in a router/gateway-integrated VoIP system in accordance with an embodiment of the present invention.

FIG. 3 is a block diagram illustrating the construction of a QoS control system of a VoIP media packet received from a broadband port in a router/gateway-integrated VoIP system in accordance with the invention. In the router/gateway-integrated VoIP system of the invention, the QoS control system of a VoIP media packet received from a broadband port includes a switch/router 100 and a VoIP gateway 200. The switch/router 100 includes an information memory 110, a traffic management processor 120, a packet size identifier 130, and a bandwidth information provider 140.

The switch/router 100 stores VoIP media packet size and bandwidth information according to the VoIP media packet size. When the switch/router 100 receives a VoIP media bandwidth information request message (hereinafter, shortly referred to as "VoIP bandwidth request message") from the VoIP gateway 200 connected thereto through a broadband local network, the switch/router 100 detects the size of a VoIP media packet from the VoIP bandwidth request message, and then transmits a response message, including available bandwidth information of a queue according to the packet size, to the VoIP gateway 200.

The information memory 110 of the switch/router 100 stores packet size information and bandwidth information according to packet size. The information stored in the information memory 110 includes size information of the VoIP media packets according to codecs, frame count information, and bandwidth information according to packet size corresponding to the size information of VoIP media packets and the frame count information. The bandwidth according to the size of the VoIP media packet is packet size×8×1000÷transmission time, or {packet header size+(payload size×frame count)}×8×1000÷(codec sampling period×frame count).

Packet size, sending period and header size are expressed as follows:

Packet size=header size+(payload size×frame count)

Sending period=codec sampling period*frame count

Header size=Inter Frame Gap (IFG) (12 bytes)+preamble (8 bytes)+Ethernet header (14 bytes)+IP header (20 bytes)+User Datagram Protocol (UDP) header (8 bytes)+Real Time Protocol (RTP) header (12 bytes)=74 bytes The payload size and sampling period of a VoIP according to the Codec ITU Standard Audio Transport Protocol in the ITU H.323 environment codec are as follows:

G.711A/u 64K: 40 byte/5 ms

G.723.1 5.3K: 20 byte/30 ms

G.723.1 6.3K: 24 byte/30 ms

G.729A 8K: 10 byte/10 ms

In the case of a mute call, 0.5 indicates the mute and the frame transport bandwidth is calculated to be 50%.

The traffic management processor 120 of the switch/router 100 manages a queue that temporarily stores VoIP media packets, and detects available bandwidth information of the queue.

The packet size identifier 130 of the switch/router 100 detects the size of a VoIP media packet from the VoIP bandwidth request message received from the VoIP gateway 200.

When the size of a VoIP media packet is detected by the packet size identifier 130, the bandwidth information provider 140 of the switch/router 100 recalculates an available bandwidth according to the packet size by referring to the information memory 110 within the available bandwidth detected by the traffic management processor 120, and then transmits a response message, including available bandwidth information of the queue according to the packet size, to the VoIP gateway 200.

When an invite message is received from an IP terminal, the VoIP gateway 200 transmits a VoIP bandwidth request message to the switch/router 100, and receives a response message, including available bandwidth information of a queue according to the packet size, from the switch/router 100. If an available bandwidth of the queue is present, the VoIP gateway 200 processes the call of the VoIP media packet by transmitting a response message to the IP terminal.

In the router/gateway integrated all-in-one VoIP system, the QoS system of a VoIP media packet received from a broadband port applies QoS only to a VoIP packet received from the switch/router 100 to which the VoIP gateway 200 is connected over a broadband local network.

Operations essential to the present invention will now be described hereinafter, and detailed descriptions of well-known functions and operations will be omitted for clarity and conciseness.

First, packet size information and bandwidth information according to the packet size are stored in the information memory 110 of the switch/router 100.

Then, as described in Table 1, the information memory 110 includes size information of VoIP media packets according to codecs, frame count information, and bandwidth information according to the packet sizes corresponding to the size information of VoIP media packets and the frame count information. The bandwidth according to the size of the VoIP media packets is packet size×8×1000÷transmission time, or {packet header size+(payload size×frame count)}×8×1000÷(codec sampling period×frame count).

TABLE 1

| | Codec | | | |
|---|---|---|---|---|
| Frame count | G.711 (40 bytes/5 msec) Silence disable | G.723.15.3K (20 bytes/30 msec) Silence disable | G.723.16.3K (24 bytes/30 msec) Silence disable | G.729A (10 bytes/10 msec) Silence disable |
| 1 | 182.4K | 25.0K | 26.1K | 67.2K |
| 2 | 123.2K | 15.2K | 16.5K | 37.6K |
| 3 | 103.5K | 11.9K | 13.0K | 27.7K |
| 4 | 93.6K | | | 22.8K |
| 5 | | | | 19.8K |

Afterwards, when an invite message is received from an IP terminal, the VoIP gateway 200 transmits a VoIP bandwidth request message to the switch/router 100.

Then, the packet size identifier 130 of the switch/router 100 detects the size of a VoIP media packet from the VoIP bandwidth request message received from the VoIP gateway 200. Irrespective of the packet size identifier 130, the traffic management processor 120 of the switch/router 100 manages a queue that temporarily stores VoIP media packets and monitors available bandwidth information of the queue.

When the size of a VoIP media packet is detected by the packet size identifier 130, the bandwidth information provider 140 of the switch/router 100 recalculates an available bandwidth according to the packet size by referring to the information memory 110 within the available bandwidth detected by the traffic management processor 120, and then transmits a response message, including available bandwidth information of the queue according to the packet size, to the VoIP gateway 200.

The VoIP gateway 200 receives the response message including the available bandwidth information of the queue according to the packet size, and if an available bandwidth of the queue is present, processes a call of the VoIP media packet by transmitting a response message to the IP terminal.

In the router/gateway integrated all-in-one VoIP system, the QoS system of a VoIP media packet received from a broadband port applies QoS only to a VoIP packet received from the switch/router 100 to which the VoIP gateway 200 is connected over a broadband local network.

Figure 4:
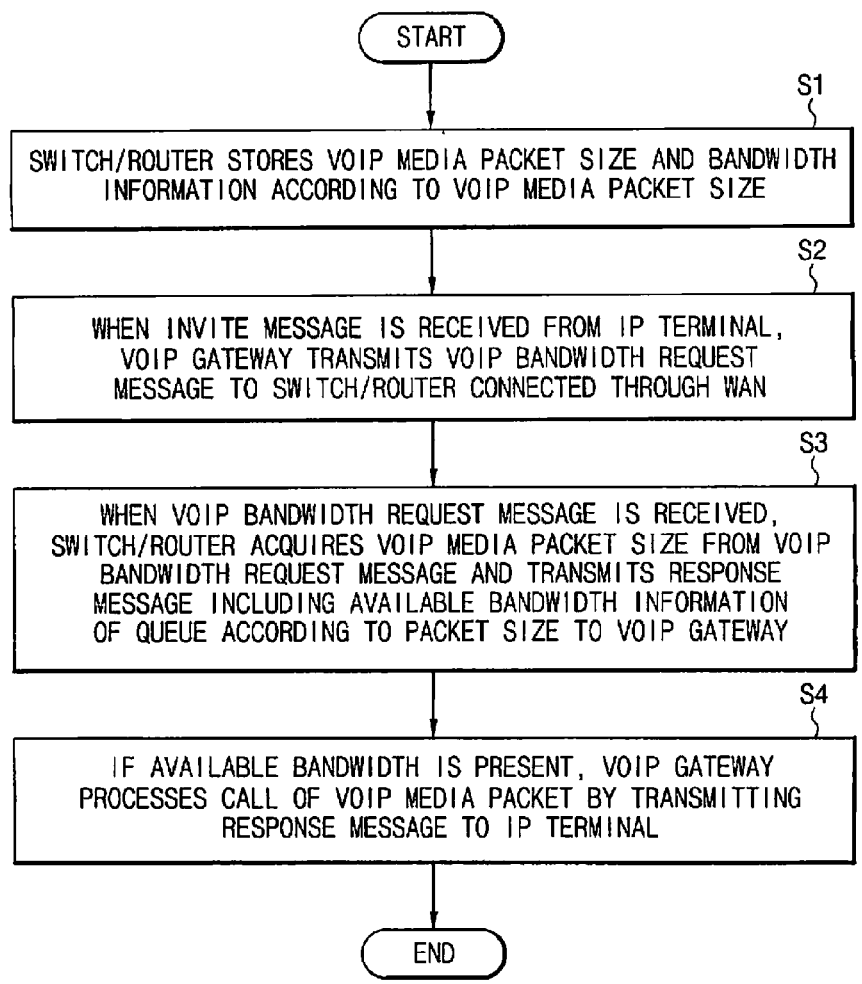
FIG. 4 is a flowchart illustrating a QoS control method of a VoIP media packet received from a broadband port in a router/gateway-integrated VoIP system in accordance with an embodiment of the present invention.

Below, with reference to FIG. 4, a description will be given of a QoS control method of a VoIP media packet received from a broadband port in the router/gateway-integrated VoIP system in accordance with an embodiment of the invention.

First, the switch/router 100 stores VoIP media packet size and bandwidth information according to the VoIP media packet size in step S1. In step S1, the information stored includes size information of VoIP media packets according to codecs, frame count information, and bandwidth information according to packet size corresponding to the size information of VoIP media packets and the frame count information. The bandwidth according to the sizes of VoIP media packets is packet size×8×1000÷transmission time, or {packet header size+(payload size×frame count)}×8×1000÷(codec sampling period×frame count).

Then, when an invite message is received from an IP terminal, the VoIP gateway 200 transmits a VoIP bandwidth request message to the switch/router 100 connected thereto through a broadband local network in step S2.

Afterwards, when the VoIP bandwidth request message is received from the VoIP gateway 200, the switch/router 100 detects the size of a VoIP media packet from the VoIP bandwidth request message, and then transmits a response message, including available bandwidth information of a queue according to the packet size, to the VoIP gateway 200 in step S3.

Figure 5:
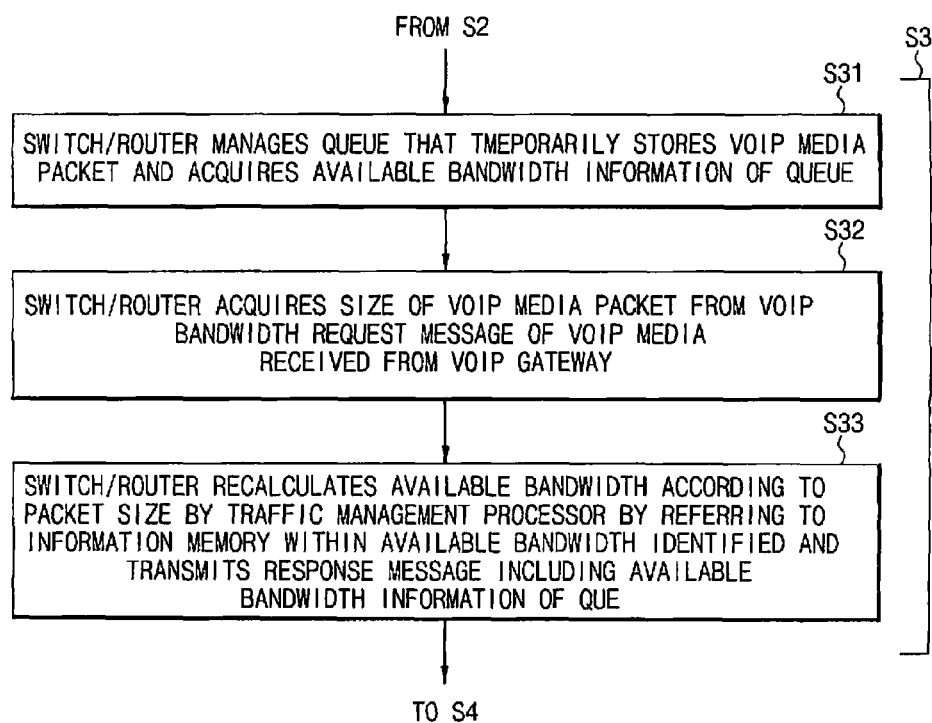
FIG. 5 is a flowchart illustrating detailed procedures of the third step of the QoS control method of a VoIP media packet received from a broadband port in a router/gateway-integrated VoIP system in accordance with an embodiment the present invention.

Below, with reference to FIG. 5, a description will be given of detailed procedures of step S3 in which the switch/router 100 transmits a response message, including the available bandwidth information of a queue according to the packet size, to the VoIP gateway 200.

First, the switch/router 100 manages a queue that temporarily stores VoIP media packets, and detects available bandwidth information of the queue in step S31.

Then, the switch/router 100 detects the size of a VoIP media packet from the VoIP bandwidth request message received from the VoIP gateway 200 in step S32.

Afterwards, the switch/router 100 recalculates available bandwidth according to the packet size by referring to the information memory 110 within the available bandwidth identified by the traffic management processor 120. Then the switch/router 100 transmits a response message, including available bandwidth information of the queue according to the packet size, to the VoIP gateway 200 in step S33.

If an available bandwidth of the queue is present, the VoIP gateway 200 processes a call of the VoIP media packet by transmitting a response message to the IP terminal in step S4. In accordance with the certain embodiments of the invention as described hereinbefore, the QoS control system and method of a VoIP media packet received from a broadband port in the router/gateway-integrated VoIP system applies QoS only to a VoIP packet received from the switch/router 100 to which the VoIP gateway 200 is connected over a broadband local network.

While the invention has been shown and described with reference to a certain exemplary embodiments thereof it will be understood by those skilled in the art that various changes in form and details may be made therein without departing from the spirit and scope of the invention as defined by the appended claims and their equivalents.

What is claimed is:

1. A Quality-of-Service (QoS) control system of a Voice over Internet Protocol (VoIP) media packet received from a broadband port in a router/gateway integrated VoIP system, comprising:
   a switch/router for storing a size of a VoIP media packet and bandwidth information according to the size of a VoIP media packet, detecting the size of a VoIP media packet from a VoIP media bandwidth information request message when the VoIP media bandwidth information request message is received from a VoIP gateway connected over a broadband local network, and transmitting to the VoIP gateway a response message, including available bandwidth information of a queue according to the size of a VoIP media packet; and
   the VoIP gateway for transmitting the VoIP media bandwidth information request message to the switch/router when an invite message is received from an Internet Protocol (IP) terminal, receiving from the switch/router the response message, including available bandwidth information of a queue according to the size of a VoIP media packet, and if an available bandwidth of the queue is present, processing a call of the VoIP media packet by transmitting a response message to the IP terminal,
   wherein an information memory stores size information of VoIP media packets, frame count information of the VoIP media packets indicating a number of frames in VoIP media packets, transmission time of VoIP media packets, and bandwidth information of VoIP media packets, and
   wherein the bandwidth information of VoIP media packets is determined according to a packet size corresponding to the size information of VoIP media packets, the frame count information of VoIP media packets, and the transmission time of VoIP media packets.

2. The QoS control system of claim 1, wherein the switch/router includes:
   the information memory for storing packet size information and the bandwidth information according to the VoIP media packet size and the transmission time of VoIP media packets;
   a traffic management processor for managing the queue, which temporarily stores VoIP media packets, and detecting available bandwidth information of the queue;
   a packet size identifier for detecting the size of a VoIP media packet from the VoIP bandwidth request message received from the VoIP gateway; and
   a bandwidth information provider for recalculating the available bandwidth according to the size of a VoIP media packet by referring to the information memory within the available bandwidth information of the queue detected by the traffic management processor when the size of a VoIP media packet is detected by the packet size identifier, and transmitting to the VoIP gateway the response message, including the available bandwidth information of the queue according to the size of a VoIP media packet and transmission time of VoIP media packets.

3. The QoS control system of claim 1, wherein the bandwidth according to the size of a VoIP media packet is packet size×8×1000÷transmission time.

4. The QoS control system of claim 1, wherein the bandwidth according to the size of the VoIP media packet is {packet header size+(payload size×frame count)}×8×1000÷(codec sampling period×frame count).

5. The QoS control system of claim 1, wherein the QoS is applied only to a VoIP packet received from the switch/router to which the VoIP gateway is connected over a broadband local network.

6. A Quality-of-Service (QoS) control method of a Voice over Internet Protocol (VoIP) media packet received from a broadband port in a router/gateway integrated VoIP system, comprising:
   storing, at a switch/router, a size of a VoIP media packet and bandwidth information according to the size of a VoIP media packet;
   transmitting, at a VoIP gateway, a VoIP media bandwidth information request message to the switch/router connected over a broadband local network when an invite message is received from an Internet Protocol (IP) terminal;

detecting, at the switch/router, the size of a VoIP media packet from the VoIP media bandwidth information request message when the VoIP media bandwidth information request message is received from the VoIP gateway;

transmitting to the VoIP gateway a response message, including available bandwidth information of a queue according to the size of a VoIP media packet; and receiving, at the VoIP gateway, the response message, including available bandwidth information of a queue according to the size of a VoIP media packet, from the switch/router; and if an available bandwidth of the queue is present, processing a call of the VoIP media packet by transmitting a response message to the IP terminal, wherein storing, at the switch/router, a size of a VoIP media packet and bandwidth information according to the size of a VoIP media packet comprises storing size information of VoIP media packets, frame count information of VoIP media packets indicating a number of frames in VOIP media packets, transmission time of VoIP media packets, and bandwidth information of VoIP media packets, and wherein the bandwidth information of VoIP media packets is determined according to packet size corresponding to the size information of VoIP media packets, the frame count information of VoIP media packets, and the transmission time of VoIP media packets.

7. The QoS control method of claim 6, wherein transmitting, at the switch/router, a response message, including available bandwidth information of a queue according to the size of a VoIP media packet and the transmission time of VoIP media packets, to the VoIP gateway, comprises:

managing the queue, which temporarily stores VoIP media packets;

detecting available bandwidth information of the queue;

detecting the size of a VoIP media packet from the VoIP bandwidth request message received from the VoIP gateway;

recalculating the available bandwidth according to the size of a VoIP media packet by referring to the information memory within the available bandwidth information of the queue detected by a traffic management processor when the size of a VoIP media packet is detected by a packet size identifier; and transmitting to the VoIP gateway the response message, including the available bandwidth information of the queue according to the size of a VoIP media packet.

8. The QoS control method of claim 6, wherein, in storing, at the switch/router, a size of a VoIP media packet and bandwidth information according to the size of a VoIP media packet, the bandwidth according to the size of a VoIP media packet is packet size×8×1000÷transmission time.

9. The QoS control method of claim 6, wherein, in storing, at the switch/router, a size of the VoIP media packet and bandwidth information according to the size of a VoIP media packet, the bandwidth according to the size of a VoIP media packet is {packet header size+(payload size×frame count)}×8×1000÷(codec sampling period×frame count).

10. The QoS control method of claim 6, wherein the QoS is applied only to a VoIP packet received from the switch/router to which the VoIP gateway is connected over a broadband local network.

* * * * *